(No Model.)

G. R. B. SWANTON.
SNAP HOOK.

No. 343,406. Patented June 8, 1886.

WITNESSES:
J. D. Garfield.
C. Sedgwick

INVENTOR
G. R. B. Swanton
BY Munn & Co.
ATTORNEY

N. PETERS, Photo-Lithographer, Washington, D. C.

UNITED STATES PATENT OFFICE.

GEORGE R. B. SWANTON, OF OKAWA, NEW ZEALAND.

SNAP-HOOK.

SPECIFICATION forming part of Letters Patent No. 343,406, dated June 8, 1886.

Application filed April 13, 1886. Serial No. 198,701. (No model.)

*To all whom it may concern:*

Be it known that I, GEORGE R. B. SWANTON, of Okawa, County of Hawke's Bay, New Zealand, have invented a new and useful Improvement in Snap-Hooks, of which the following is a specification, reference being had to the annexed drawings, forming a part thereof, in which—

Figure 1:
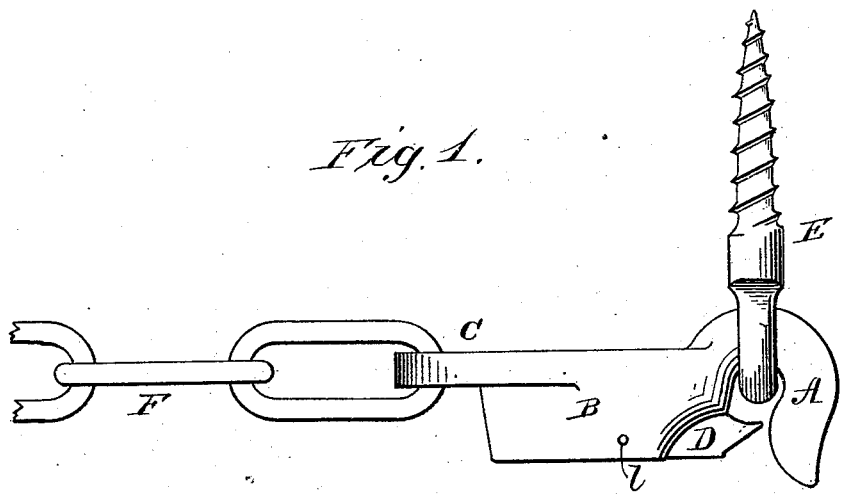
Figure 2:
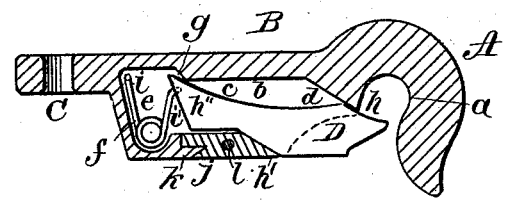
Figure 3:
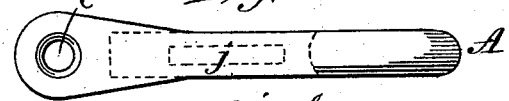
Figure 4:
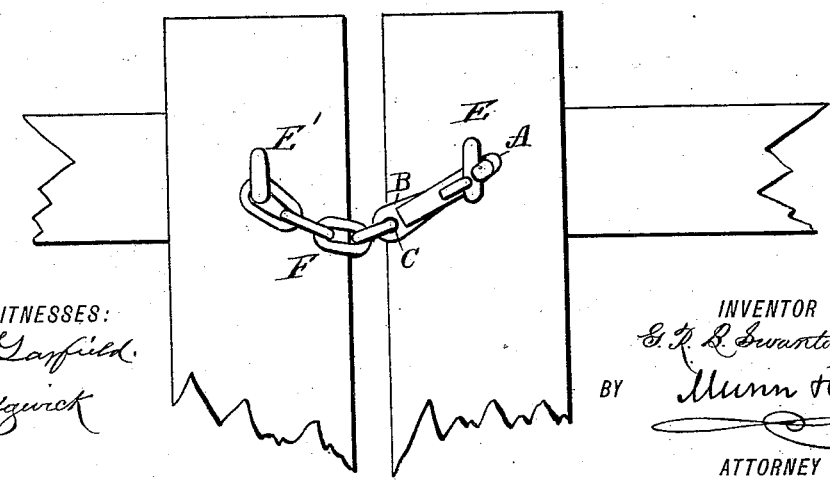

Figure 1 is a side elevation of my improved snap-hook. Fig. 2 is a longitudinal section. Fig. 3 is an edge view. Fig. 4 shows the application of my improved snap-hook as a gate-fastener.

Similar letters of reference indicate corresponding parts in the different figures of the drawings.

The object of my invention is to provide a simple, strong, and secure snap-hook for use in connection with gate-fastening chains, parts of harness, and for other purposes requiring a simple and secure hook.

My invention consists in a hook provided with a chambered shank, in which is fitted an obliquely-sliding bolt, and a spring for projecting the bolt and retaining it in a projected position in the bow of the hook.

The hook A is formed integrally with the chambered body B, having on the end thereof an eye, C, for receiving a chain, strap, or other device in connection with which the hook is used. The end of the hook A is bent inward slightly toward the chambered shank B, forming a concave, $a$, for receiving and retaining the eye of an eyebolt or screw-eye, or the ring belonging to a portion of a harness. The chamber $b$ of the shank B has a straight portion, $c$, an inclined portion, $d$, opening toward the point of the hook A, and an enlargement, $e$, of the chamber at the closed end of the shank for receiving the spring $f$. At the juncture of the enlarged portion of the chamber with the straight portion thereof is formed a shoulder, $g$. A bolt, D, beveled at its outer end, and having the inclined faces $h$ $h'$ adjoining its outer end, and the inclined face $h''$ at its inner extremity, is fitted to the chamber $b$ with its inclined sides $h$ $h'$ arranged to slide in the oblique part of the chamber and its inclined surface $h''$ arranged to slide in contact with the shoulder $g$.

The spring $f$ consists of a wire bent into a spiral with its ends $i$ $i'$ extending upward in the enlarged part $e$ of the chamber $b$, the arm $i'$ being bent at right angles and inserted in a cavity in the end of the bolt D, the arm $i$ resting against the inner end of the chamber.

For convenience in the manufacture of the snap-hook, a portion of the wall $j$ of the chamber $b$ is made removable, and is connected with the fixed part of the wall by a dovetail joint, $k$, which is secured in place in the chambered shank by the rivet $l$ passing through the sides of the shank and through the removable part $j$.

When in use as a gate-fastener, the hook is brought into engagement with the screw-eye E, as shown in Figs. 1 and 4, and a chain, F, is received in the eye C, and the opposite end of the chain is provided with a screw-eye, E', similar to the screw-eye E, which is inserted in the gate-post. Arranged in this manner the fastener is adapted to gates that are liable to rise and fall and twist out of shape, as it permits of considerable change in the relative position of the eyes E E' without interfering with the efficiency of the fastener.

It is obvious that the form of the hook may be changed to adapt it to the purpose for which it is used, the hook A being made larger or smaller, and the eye C being enlarged or made oblong to receive a strap, or arranged transversely, and at any desirable angle with the hook A.

When the bolt D is projected, as shown in Figs. 1 and 2, no pressure that can be brought upon it by the ring contained by the hook can force it back into the chamber $b$, as pressure in any direction against the inner edge of the bolt would tend to bring the inclined surfaces $h'$ $h''$ more firmly down upon their bearings in the chambered shank.

Having thus described my invention, what I claim as new, and desire to secure by Letters Patent, is—

1. The combination, with the hook A, provided with the shank B, containing a chamber, $b$, having the oblique portion $d$ and the shoulder $g$, of the spring-acted bolt D, having the inclined surfaces $h$ $h'$ $h''$, substantially as herein shown and described.

2. In a snap-hook provided with a chambered shank, B, and an obliquely-sliding bolt, D, the combination, with the shank, of the removable section $j$, substantially as herein shown and described.

3. As an improved article of manufacture, a snap-hook formed of a hook, A, the shank B, provided with the chamber $b$, having the oblique portion $d$, the enlarged portion $e$, and the shoulder $g$, the bolt D, having a beveled end, and the inclined surfaces $h\ h'\ h''$, the two-armed spring $f$, received in the enlarged portion of the chamber and tending to press the bolt D outward, and the eye C, for receiving the chain or strap, substantially as herein shown and described.

GEORGE R. B. SWANTON.

Witnesses:
GEO. M. HOPKINS,
C. SEDGWICK.